US011960620B2

(12) United States Patent
Mattsson

(10) Patent No.: US 11,960,620 B2
(45) Date of Patent: *Apr. 16, 2024

(54) DISTRIBUTED TOKENIZATION USING SEVERAL SUBSTITUTION STEPS

(71) Applicant: Protegrity Corporation, Grand Cayman (KY)

(72) Inventor: Ulf Mattsson, Cos Cob, CT (US)

(73) Assignee: PROTEGRITY CORPORATION, Grand Cayman (KY)

(*) Notice: Subject to any disclaimer, the term of this patent is extended or adjusted under 35 U.S.C. 154(b) by 652 days.

This patent is subject to a terminal disclaimer.

(21) Appl. No.: 16/953,721

(22) Filed: Nov. 20, 2020

(65) Prior Publication Data

US 2021/0073414 A1    Mar. 11, 2021

Related U.S. Application Data

(63) Continuation of application No. 16/582,075, filed on Sep. 25, 2019, now Pat. No. 10,885,222, which is a
(Continued)

(51) Int. Cl.
*G06F 16/00* (2019.01)
*G06F 16/903* (2019.01)
(Continued)

(52) U.S. Cl.
CPC .... *G06F 21/6245* (2013.01); *G06F 16/90344* (2019.01); *G07F 7/084* (2013.01);
(Continued)

(58) Field of Classification Search
CPC .... G06F 16/1727; G06F 3/0643; G06F 16/11; G06F 16/13; G06F 3/0607; G06F 3/067;
(Continued)

(56) References Cited

U.S. PATENT DOCUMENTS 5,325,092 A   6/1994  Allen et al.
5,410,475 A   4/1995  Lu et al.
(Continued)

FOREIGN PATENT DOCUMENTS

EP     2105894         9/2009
WO     WO 2008/036914  3/2008
WO     WO 2009/023384  2/2009

OTHER PUBLICATIONS

European Examination Report, European Application No. 11156406.8, dated Feb. 15, 2013, 7 pages.
(Continued)

*Primary Examiner* — Shyue Jiunn Hwa
(74) *Attorney, Agent, or Firm* — Fenwick & West LLP

(57) ABSTRACT

A method for distributed tokenization of sensitive strings of characters, such as social security numbers, credit card numbers and the like, in a local server is disclosed. The method comprises the steps of receiving from a central server at least one, and preferably at least two, static token lookup tables, and receiving a sensitive string of characters. In a first tokenization step, a first sub string of characters is substituted with a corresponding first token from the token lookup table(s) to form a first tokenized string of characters, wherein the first sub string of characters is a substring of the sensitive string of characters. Thereafter, in a second step of tokenization, a second sub string of characters is substituted with a corresponding second token from the token lookup table(s) to form a second tokenized string of characters, wherein the second substring of characters is a substring of the first tokenized string of characters. Optionally, one or more additional tokenization steps is/are used.

14 Claims, 9 Drawing Sheets

Related U.S. Application Data continuation of application No. 15/470,356, filed on Mar. 27, 2017, now Pat. No. 10,467,428, which is a continuation of application No. 14/942,668, filed on Nov. 16, 2015, now Pat. No. 9,639,716, which is a continuation of application No. 14/257,875, filed on Apr. 21, 2014, now Pat. No. 9,219,716, which is a continuation of application No. 12/659,200, filed on Mar. 1, 2010, now Pat. No. 8,745,094.

(51) Int. Cl.
*G06F 21/62* (2013.01)
*G07F 7/08* (2006.01)
*G07F 7/10* (2006.01)
*H04L 9/08* (2006.01)
*H04L 9/40* (2022.01)

(52) U.S. Cl.
CPC ............ *G07F 7/1008* (2013.01); *H04L 9/083* (2013.01); *H04L 9/0897* (2013.01); *H04L 63/0428* (2013.01); *H04L 2209/56* (2013.01)

(58) Field of Classification Search
CPC .. G06F 16/285; G06F 11/1435; G06F 16/275; G06F 16/2291; G06F 16/2237; G06F 16/1847; G06F 16/18; G06F 16/1865; G06F 16/10; G06F 21/606; G06F 16/9535; G06F 16/958; G06F 21/316; G06F 21/552; G06F 21/72; G06F 21/83; G06F 15/7842; G06F 40/169; G06F 40/58; G06F 9/4488; G07F 7/1008; G07F 7/084; G07F 7/1016; G07F 19/206; G07F 7/0873; G07F 7/088; G07F 7/0886; G07F 7/1041; G07F 7/1083; G06Q 20/367; G06Q 20/3823; G06Q 20/382; G06Q 20/3829; H04L 2209/56; H04L 9/3234

See application file for complete search history.

(56) References Cited

U.S. PATENT DOCUMENTS

| | | | |
|---|---|---|---|
| 5,577,249 A | 11/1996 | Califano | |
| 6,263,333 B1 | 7/2001 | Houchin et al. | |
| 6,470,345 B1* | 10/2002 | Doutre | G06F 16/10 |
| | | | 707/999.102 |
| 6,515,988 B1 | 2/2003 | Eldridge et al. | |
| 6,653,954 B2 | 11/2003 | Rijavec | |
| 6,898,711 B1 | 5/2005 | Bauman et al. | |
| 7,120,933 B2 | 10/2006 | Mattsson | |
| 7,219,330 B2 | 5/2007 | Hogg et al. | |
| 7,305,707 B2 | 12/2007 | Mattsson | |
| 7,316,011 B1 | 1/2008 | Rajaram et al. | |
| 8,051,096 B1 | 11/2011 | Elbaz et al. | |
| 8,301,437 B2 | 10/2012 | Parikh | |
| 8,578,176 B2 | 11/2013 | Mattsson | |
| 8,745,094 B2 | 6/2014 | Mattsson | |
| 9,219,716 B2 | 12/2015 | Mattsson | |
| 9,639,716 B2 | 5/2017 | Mattsson | |
| 10,467,428 B2 | 11/2019 | Mattsson | |
| 2003/0097596 A1 | 5/2003 | Muratov et al. | |
| 2004/0172627 A1 | 9/2004 | Ramani | |
| 2005/0102509 A1 | 5/2005 | Fascenda | |
| 2005/0234717 A1 | 10/2005 | Weise et al. | |
| 2007/0140496 A1 | 6/2007 | Phinney | |
| 2007/0208671 A1 | 9/2007 | Brown et al. | |
| 2007/0226150 A1 | 9/2007 | Pietrzak et al. | |
| 2007/0271242 A1 | 11/2007 | Lindblad | |
| 2007/0288744 A1 | 12/2007 | Wang | |
| 2008/0010256 A1 | 1/2008 | Lindblad et al. | |
| 2008/0028378 A1 | 1/2008 | Biswas et al. | |
| 2008/0170693 A1 | 7/2008 | Spies et al. | |
| 2008/0222603 A1 | 9/2008 | Shaw et al. | |
| 2009/0048953 A1 | 2/2009 | Hazel et al. | |
| 2009/0169016 A1 | 7/2009 | Dodd | |
| 2009/0249082 A1 | 10/2009 | Mattsson | |
| 2010/0023514 A1 | 1/2010 | Parikh | |
| 2010/0198756 A1 | 8/2010 | Zhang et al. | |
| 2010/0257145 A1 | 10/2010 | Felsheim | |
| 2011/0013555 A1* | 1/2011 | Rautiola | H04W 60/00 |
| | | | 370/328 |
| 2011/0035390 A1 | 2/2011 | Whitehouse | |
| 2011/0154466 A1 | 6/2011 | Harper et al. | |
| 2011/0154467 A1 | 9/2011 | Bomar et al. | |

OTHER PUBLICATIONS

European Extended Search Report, European Application No. 11156406.8, dated Nov. 7, 2011, 6 pages.

U.S. Appl. No. 61/288,102 by Glenn E. Harper, filed Dec. 18, 2009 (Specification, Whole Document.pdf).

United States Office Action, U.S. Appl. No. 12/659,200, filed Aug. 3, 2012, 22 pages.

United States Office Action, U.S. Appl. No. 12/659,200, filed Dec. 19, 2013, 12 pages.

United States Office Action, U.S. Appl. No. 12/659,200, filed Jan. 19, 2012, 23 pages.

United States Office Action, U.S. Appl. No. 14/257,875, filed May 22, 2015, 15 pages.

United States Office Action, U.S. Appl. No. 14/942,668, filed Nov. 3, 2016, 16 pages.

United States Office Action, U.S. Appl. No. 15/470,356, filed Jun. 6, 2019, 13 pages.

United States Office Action, U.S. Appl. No. 16/582,075, filed Sep. 2, 2020, twenty-one pages.

\* cited by examiner

DISTRIBUTED TOKENIZATION USING SEVERAL SUBSTITUTION STEPS

CROSS REFERENCE TO RELATED APPLICATIONS

This application is a continuation of U.S. application Ser. No. 16/582,075, filed Sep. 25, 2019, now issued as U.S. Pat. No. 10,885,222, which is a continuation of U.S. application Ser. No. 15/470,356, filed Mar. 27, 2017, now issued as U.S. Pat. No. 10,467,428, which is a continuation of U.S. application Ser. No. 14/942,668, filed Nov. 16, 2015, now issued as U.S. Pat. No. 9,639,716, which application is a continuation of U.S. application Ser. No. 14/257,875, filed Apr. 21, 2014, now issued as U.S. Pat. No. 9,219,716, which is a continuation of U.S. application Ser. No. 12/659,200, filed Mar. 1, 2010, now issued as U.S. Pat. No. 8,745,094, all of which are incorporated by reference in their entirety.

FIELD OF THE INVENTION

The present invention relates to a system and a method for distributed tokenization of sensitive strings of characters in a local server.

BACKGROUND OF THE INVENTION

Handling of sensitive strings of characters, such as credit card numbers, is often problematic. In a typical retail situation, the card is swiped at a register, and then transferred to a local server, where information about the transaction and the credit card number is stored. The information may also be stored at the registers. The information is also forwarded to servers at higher levels, such as a central server for the region, the nation etc. At all levels, it is important that enough information about the transaction is stored to render follow-up checks, audits, analysis etc. possible. However, at the same time the information stored on the servers is a security risk, and the risk is inevitably higher on the lower levels of the hierarchy. Even though the examples discussed in this application are mostly concerned with credit card numbers, similar type of problems are encountered in handling other strings of sensitive characters, such as social security numbers, driving license numbers, bank account numbers, etc. For example, social security numbers are in many systems less protected than credit card data.

The problem is often not that cryptography is not used, or used badly, but that the data itself is too weak to protect adequately—there are simply not enough possible credit card numbers, allowing an attacker routine measures to test them all using simple brute force techniques. While it may appear that a credit card number is 16 digits, and $10^{16}$ would be an insurmountably large number of tests, more than half of a card number is easily learned or is "guessable". First, the last four digits of a card number are normally not required to be secured, and are in fact helpfully printed on receipts, and are permitted to be present in the stored data. Thus, these digits may reside in register printer logs, sales data, etc. If I knew four digits and were to guess all the remaining digits, I would have to make only $10^{12}$ guesses instead of $10^{16}$. Further, credit association is identified by the first digit on a credit card: "4" for Visa, "5" for Mastercard, "3" for American Express, etc. This can be used in reverse. If a credit transaction identifies the association (by printing the word VISA, for example) I know the first digit of the credit card is a 4. Combined with the last four digits, I now have to make only $10^{11}$ guesses. In most markets around a country, there are also often only a handful of card issuing banks that will dominate any given area. There are perhaps a dozen truly cosmopolitan large cities that have a great diversity of credit cards, but in the vast majority of e.g. American heartland cities only a few banks issue a large fraction of the cards a retailer will see; perhaps as many as 50% of cards are issued by just 10 banks or so in a given region. A retailer with a private label Visa or Mastercard will have an even easier avenue of attack. The first 6 digits of a card number are devoted to the Bank Identification Number (BIN). If 10 banks issue 50% of the Visa cards used in a geographic region, that means I have one chance in ten of correctly identifying perhaps 50% of the BINs, if know the region the card was used in. And ordinary merchant identification, such as a store number, will give me the region. Six digits is a lot to reduce the search space by: it gets me from $10^{12}$ to $10^{6}$ guesses; but with 10 possible BIN numbers to try I have to make $10^{7}$ guesses. In addition, the final digit of a credit card number is conventionally a check-sum digit, calculated by the so-called Luhn algorithm. Just because the check digit is computed and placed as the last digit does not mean I cannot use it to verify a test of an account number. I can generate a test case with the nine digits I know, generate six digits sequentially, and compute the check digit to recover the missing digit. Thus I start out knowing "ten" digits worth of a sixteen digit card number. I now have to test only $10^{6}$ digits. On a modern desktop that calculation would take 4 seconds or less. Further, there is the risk that protective algorithms present in cash register software can be obtained by thieves by the simple act of stealing a register's hard drive.

In this context, it is also to be remembered that the goal of an attacker is very different from the goals of the retailer. The attacker is not trying to do the same job as a sales auditor, and does not have to identify every specific account number from any given protective scheme with 100% accuracy. The goal of an attacker is to acquire as many account numbers as easily as possible. With a stolen database of sales information, cracking even 25% of the valid credit card numbers would yield great profits.

There are in principle three different ways to render data unreadable: 1) Two-way cryptography with associated key management processes, 2) One-way transformations including truncation and one-way cryptographic hash functions, and 3) Index tokens and pads. Two-way encryption of sensitive data is one of the most effective means of preventing information disclosure and the resultant potential for fraud. Cryptographic technology is mature and well proven. The choice of encryption scheme and topology of the encryption solution is critical in deploying a secure, effective and reasonable control. Hash algorithms are one-way functions that turn a message into a fingerprint, usually not much more than a dozen bytes long. Truncation will discard part of the input field. These approaches can be used to reduce the cost of securing data fields in situations where you do not need the data to do business and you never need the original data back again. Tokenization is the act of substituting the original data field with reference or pointer to the actual data field. This enables you to store a reference pointer anywhere within your network or database systems. This approach can be used to reduce the cost of securing data fields along with proper network segmentation in situations where you do not need the data to do business, if you only need a reference to that data.

Thus, problems that need to be addressed in secure handling of sensitive strings of characters are e.g. that you typically do not want to outsource your data, since you cannot at the same time outsource your risk and liability. Accordingly, an organization will normally not be willing to move the risk from its environment into a potentially less secure hosted environment. Further, you normally need to maintain certain information about transactions at in the point of sales (POS), as well as on higher levels. In most retail systems, there are a plurality of applications that use or store card data, from the POS to the data warehouse, as well as sales audit, loss prevention, and finance. At the same time, the system need to be adequately protected from attacks from data thieves. Still further, protective measures cannot be allowed to be complicated, cumbersome and expensive.

The US application US 2009/249082 by the same applicant and same inventor addresses some of these questions.

However, there is still a need for a tokenization method that can be performed at a local server and which requires relatively low data processing and data storage capacity, and which still provides an adequate security level. There is also a need for a tokenization method that can be installed and run on a local server to a relatively low cost.

SUMMARY OF THE INVENTION

It is therefore an object of the present invention to provide an improved method and a system for distributed tokenization of sensitive strings of characters in a local server alleviating the above-discussed disadvantages and problems of the prior art.

This object is achieved with a method and a system according to the appended claims.

According to the invention, there is provided a method for distributed tokenization of sensitive strings of characters in a local server, said method comprising the steps:

receiving from a central server at least one static token lookup table;
receiving a sensitive string of characters;
substituting a first substring of characters with a corresponding first token from said at least one token lookup table to form a first tokenized string of characters, said first substring of characters being a substring of said sensitive string of characters; and
substituting a second sub string of characters with a corresponding second token from said at least one token lookup table to form a second tokenized string of characters, said second substring of characters being a substring of said first tokenized string of characters.

The term "characters" is herein used to indicate any alphanumerical values. Accordingly, the sensitive string of characters can consist of solely numerical digits, as is typically the case for credit card numbers, bank account numbers, social security numbers, driver license numbers and birth certificate numbers. However, the sensitive string of characters can alternatively consist of solely alphabetic letters, or a combination of letters and numbers. The sensitive string of characters is preferably at least one of a number associated with personal information related to an individual, such as a social security number, and a number associated with financial holdings and transactions, such as a credit card number or a bank account number.

The term "token" is in the context of this application used to indicate a set or string of characters useable to substitute another set or string of characters. The token may have the same number of characters as the string being replaced, or a different number of characters. Further, the token may have characters of the same type as the string of characters being replaced, such as digits or alphanumerical characters, or characters of a different type.

The term "static token lookup table" is in the context of this application used to indicate a table comprising a static association between possible input values, i.e. possible character combinations of a set or string of characters to be replaced with a token, and one or more tokens. Preferably, the static token lookup table comprises a first column comprising the input values of the string of characters to be replaced, and preferably every possible value for the string of characters to be replaced, and a second column with a specific token for every input values of the string of characters to be replaced of the first column. Each token in the second column preferably has a unique value. Optionally, the table may also comprise one or several additional columns with token values.

The present invention provides a very efficient tokenization method. By using at least two separate substituting steps, a relatively low processing capacity and data storage capacity is required, and at the same time a high degree of security is obtained. Further, the tokenization is performed locally, at the local server, with low demands on the communication network. After reception of the token lookup table(s) from the central server, the tokenization may even be performed when the local server is disconnected from the network. Thus, the local server can operate as stand-alone units at times when it is not connected to the central server, since the tokenization occurs locally, and there is no need to have access to the central server around the clock. Further, the system is highly predictable, since the tokens used by the local server are assigned as static token lookup tables provided by the central server. The present invention is also operable within existing systems, and can easily be used directly in any organization's system, thus avoiding any need for outsourcing of vital functions, and hosting of third parties. For example, the tokenization method of the present invention may be used in the system disclosed in the hierarchical system disclosed in US 2009/249082 by the same applicant and same inventor, said application hereby incorporated by reference.

The final tokenized string of characters, which may be the second tokenized string of characters, or optionally the third or subsequent tokenized set of characters if further tokenization steps are used, preferably comprises characters which have not been replaced by tokens, said characters thus being identical to the corresponding characters of said sensitive string of characters. Thus, the final tokenized string of characters preferably comprises one or several parts containing original data from the sensitive set of characters, and one or several parts containing substituted, tokenized data.

By using at least two substitution steps, substituting different substrings of characters with tokens, it is possible to use relatively small token lookup tables, and still obtain a security level comparable or even better than when using much larger token lookup tables in a single substitution step. Thus a very fast tokenization process may be obtained, and with limited use of processing and storage capacity.

Further, the new tokenization method makes it easy to customize the security level in various ways, thereby enabling a security level for each local server which is adequate for its specific needs and use environment. The security level can e.g. be customized by the choice of substitution scheme when using the token lookup table for substituting substrings of characters with tokens, the length and format of the token lookup tables, the frequency of switching token lookup tables in the local server, etc. Thus, the present invention makes it possible to effectively balance between the need for an adequate security and the need for speed and computing power.

The limited size of the token lookup table required in the present tokenization method, since it enables tokenization of strings of characters much larger than the token size, makes the distribution of the token lookup tables simple and effective, and also enables a limited security risk at each local server. The method is therefore very manageable even when used on a large scale.

Still further, the use of static token lookup tables efficiently avoids the risk of collisions within the system.

Since the tokens are used to substitute only a part of each sensitive string of characters, each tokenized string of characters may still contain at least one of the original characters. Hereby, the tokenized strings of characters may still be used for analysis, follow-ups etc when e.g. the characters containing certain information, such as the BIN codes of credit card numbers, can be maintained.

The present invention is especially useful in a distributed system for retail industry, and can e.g. be compliant with the Payment Card Industry (PCI) Data Security Standard (DSS). By means of the present invention the risk exposure can be minimized, but still allowing merchants to get to their data for business needs.

It is possible to use the same token lookup table for substituting several substrings of characters. Such an embodiment requires very low data processing capacity and data storage capacity at the local server, but provides a somewhat lower degree of security. However, when this is e.g. used in substitution steps where one or several subsequent substrings to be substituted comprises characters previously been substituted by tokens, the security level may still be very high, and adequate for many types of applications.

However, preferably at least two static token lookup tables are received from the central server, wherein the at least two lookup tables are used to substitute different substrings of characters. The use of two or more static token lookup tables enhances the security, and since the token lookup tables may still be relatively small, there is still a very limited need for data processing capacity and data storage capacity at the local server. Preferably, a first of the at least two lookup tables is used to substitute the first substring of characters and a second of said at least two lookup tables is used to substitute the second substring of characters.

It is also preferred that the second substring includes at least one character having been substituted by said first token. Hereby, a chained tokenization is obtained, where at least some characters are tokenized two or more times. This provides an enhanced security. It is possible to include all the characters of the tokenized first substring in the subsequent second tokenization. However, preferably the second substring further includes at least one character not having been substituted by said first token. Hereby, a increased total number of characters are tokenized, some of which are tokenized two or more times, which enhances security even further.

The method may involve more than two consecutive substitution steps, involving one, two or more token lookup tables. In one embodiment, the method further comprises the step of substituting a third substring of characters with a corresponding third token from said at least one token lookup table to form a third tokenized string of characters, said third part of characters being a substring of said second tokenized string of characters. Using more than two substitution steps enhances the security further.

Preferably, at least the first substrings of characters comprises only numerical characters. A simple tokenization only involves tokens with numerical characters. However, preferably at least one of said tokens comprises alphanumerical characters. This provides an enhanced range of possible tokens. This also makes it possible to substitute at least one substring of characters with a token comprising alphanumerical characters with fewer characters than the corresponding substring of characters being substituted. This may e.g. be utilized to complete the resulting tokenized string of characters with additional characters containing metadata to the tokenized string of characters. Such metadata may comprise information about what token lookup generation that has been used, the token domain, etc.

The method further preferably comprises the steps of: transferring at least one of said sensitive string of characters and said tokenized string(s) of characters to the central server; and canceling said sensitive string of characters from said local server within a limited time from said transferring, while maintaining at least one tokenized string of characters in a local database connected to said local server. Hereby, the local server will only maintain tokenized data, which enhances security. The canceling of the sensitive string of characters from said local server is preferably performed regularly, and preferably at least once every 24 hours. For example, the cancellation may take place after business hours every working day. The method may further comprise the step of generating a hash value for said sensitive string of characters, and storing said hash value in association with said tokenized string of characters in the local server. This further reduces the need to maintain the original string of sensitive characters at lower levels of the hierarchy. Hash values may be used on some or all levels in a hierarchical system.

The sensitive string of characters preferably comprises at least one substrings of characters generated in a random fashion, wherein in said step of substituting said part to be substituted is contained within said substring of random characters. For example, a credit card number typically comprises some initial digits indicating issuing organization, country, etc, and at least one checksum digit at the end, whereas the remaining digits are typically generated in a random fashion. Further, the sensitive string of characters preferably comprises at least 16 characters, wherein said substring to be substituted by a token comprises at least 6 characters.

The at least one token lookup table is preferably a list mapping at least one token value to each possible character combination of the part of said sensitive string of characters to be substituted. In order to increase the security further, the list is preferably substituted regularly in said local server.

When transferred between different units, the string of sensitive characters is preferably transferred between the units in encrypted form. Further, the key for said encryption is preferably renewed regularly, wherein a new key is generated based on the current key, and wherein the current key is subsequently erased in units of lower hierarchic level.

As an extra security measure, the frequency of substituting a part of a sensitive string of characters with a token to form a tokenized string of characters within each local server may be continuously monitored. This "velocity checker" may be used to issue an alarm if a determined threshold level is exceeded, whereby attempts to receive information about the tokenization process may be hindered.

Alternatively or additionally, it is also possible to use intrusion detection based on intrusion detection profiles for different user for improving the security of the database(s). Such intrusion detection methods are e.g. described in U.S. Pat. Nos. 7,120,933 and 7,305,707, both by the same applicant, said patents hereby incorporated by reference.

As a further option, the step of substituting a part of the sensitive string of characters with a token to form a tokenized string of characters may further comprise the sub-step of performing a check-sum test for the last digit of said tokenized string of characters, and, in case the result of said check-sum test is unsatisfactory, repeating said step of substituting with another token until said check-sum test is satisfied. If the check-sum digit is correct, the tokenized string of characters may be mistaken for an original sensitive string of characters. Thus, for some applications, the result of the check-sum test may be deemed unsatisfactory if the check-sum digit is correct, whereas for other applications, the result of the check-sum test may be deemed unsatisfactory if the check-sum digit is incorrect.

Alternatively or additionally, it is also possible to use a special indicator in the tokens, to make the tokenized string of characters clearly recognizable, and to make certain that the tokenized string of characters is not mistaken for e.g. a valid credit card number. For example, the special indicator may be the character "T". Further, the special indicator may be assigned a certain position in the token, such as the first position in the token.

Still further, it is also possible to modify, in a predetermined way, one or several of the substrings to be tokenized. Hereby, the tokenization of the same substring will not be the same at all times, which enhances the security further. For example, it is possible to use an initialization vector, comprising a predetermined string of characters, to modify the substring to be tokenized before tokenization. The modification may e.g. be a linear addition or XOR operation of the initialization vector to the substring to be tokenized. The initialization vector may e.g. be formed by characters or digits in the sensitive string of characters which are not to be substituted by tokens.

According to another aspect of the invention there is provided a local server for distributed tokenization of sensitive strings of characters comprising:
 means for receiving from a central server at least one static token lookup table;
 means for receiving a sensitive string of characters;
 means for substituting a first sub string of characters with a corresponding first token from said at least one token lookup table to form a first tokenized string of characters, said first sub string of characters being a sub string of said sensitive string of characters; and
 means for substituting a second sub string of characters with a corresponding second token from said at least one token lookup table to form a second tokenized string of characters, said second substring of characters being a substring of said first tokenized string of characters.

According to still another aspect of the invention, there is provided a system for distributed tokenization of sensitive strings of characters comprising:
 central server capable of generating static token lookup table; and
 at least one local server;
 wherein the at least one local server comprises:
 means for receiving from the central server at least one static token lookup table;
 means for receiving a sensitive string of characters;
 means for substituting a first sub string of characters with a corresponding first token from said at least one token lookup table to form a first tokenized string of characters, said first sub string of characters being a sub string of said sensitive string of characters; and
 means for substituting a second sub string of characters with a corresponding second token from said at least one token lookup table to form a second tokenized string of characters, said second substring of characters being a substring of said first tokenized string of characters.

According to these further aspects of the invention, similar advantages as discussed above in relation to the first aspect are obtainable, and the preferable features as discussed above are also applicable in relation to these aspects of the invention.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

The method and system of the present invention will in the following be described in connection with a hierarchical system involving many servers on different levels. However, the present invention may also be used in more reduced systems, optionally only involving a single local server and a single central server.

Figure 1:
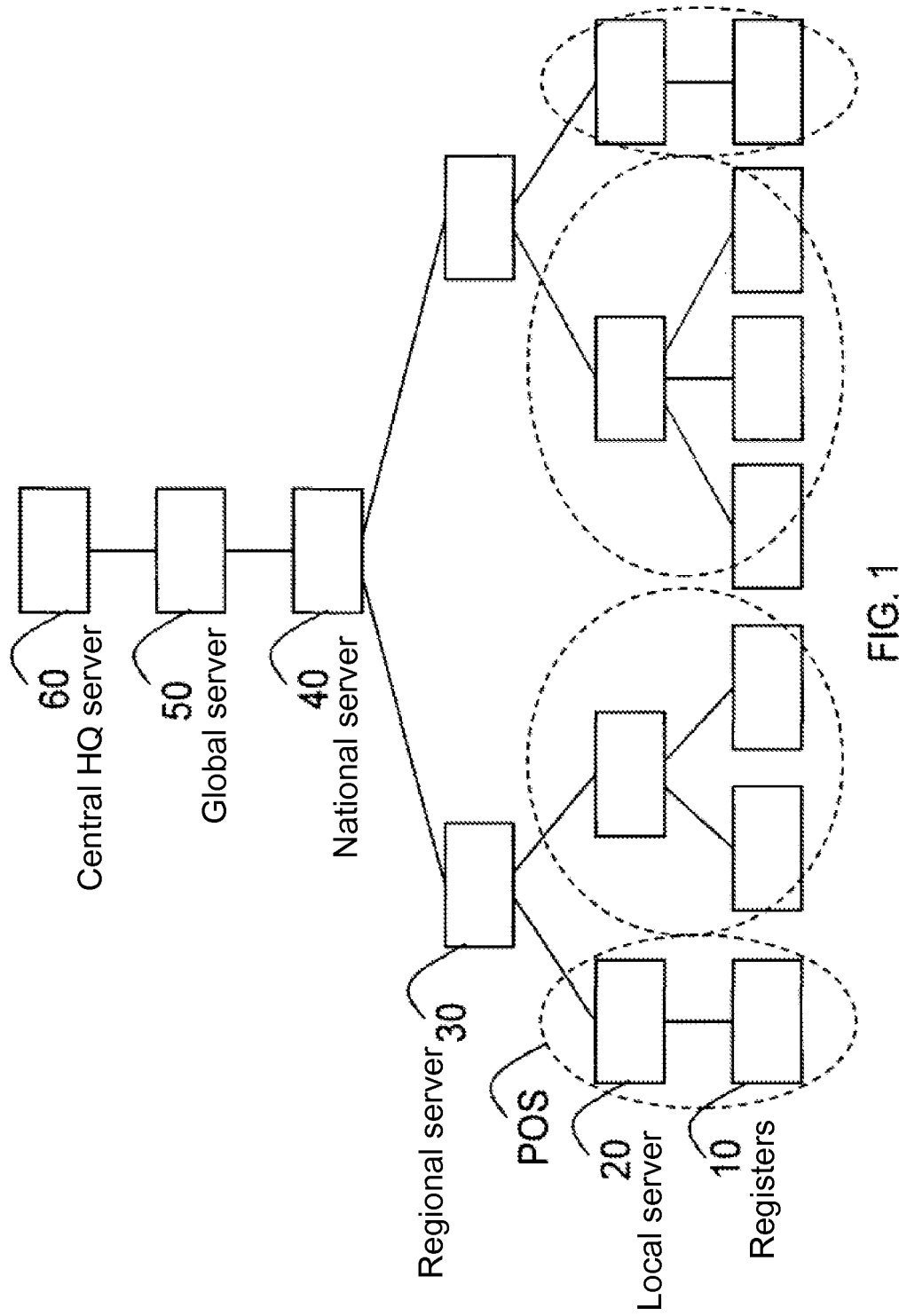
FIG. 1 is a schematic overview of a hierarchical system for handling sensitive strings of characters in accordance with an embodiment of the present invention.

With reference to FIG. 1, a hierarchical system for handling sensitive strings of characters is schematically illustrated. The system comprises registers 10 connected to a local server 20. Each local server 20 defines a point of sale (POS), illustrated with dashed lines, and each local server 20 may be connected to a plurality of registers 10. In large retail stores, a local server may be connected to hundreds of registers. The local servers at different POS are connected to one or several central server(s). In this example, the local servers are connected to two different regional servers 30, each serving a specific region or district. The regional servers 30 are connected to a national server 40, which in turn is connected to a global server 50, which in turn is connected to a central head quarter server 60. Even though not illustrated in this drawing, it should be acknowledged that each server can be connected to one or several servers on a lower level. Further hierarchical levels are also feasible, as well as fewer levels. For example, in a less vast system, all local servers may be connected directly to a single central server. Still further, the number of local servers may be any from a single local server to hundreds of local servers or more.

The units 10 providing the sensitive string of characters to the local server 20 is not limited to cash registers, and may be any type of business application or the like. The unit 10 provides clear data field information regarding the sensitive string of characters to be tokenized to the local server 20, and receives as a result a tokenized string of data. If several local servers are used, these may be arranged on different hierarchical levels, and may have different security levels. Accordingly, the security level may be customized for each local server to a level appropriate for the use and function of the local server. Token translation may also be used for communicating data between different local servers, even if different security levels are applied for the two or more local servers.

Figure 2:
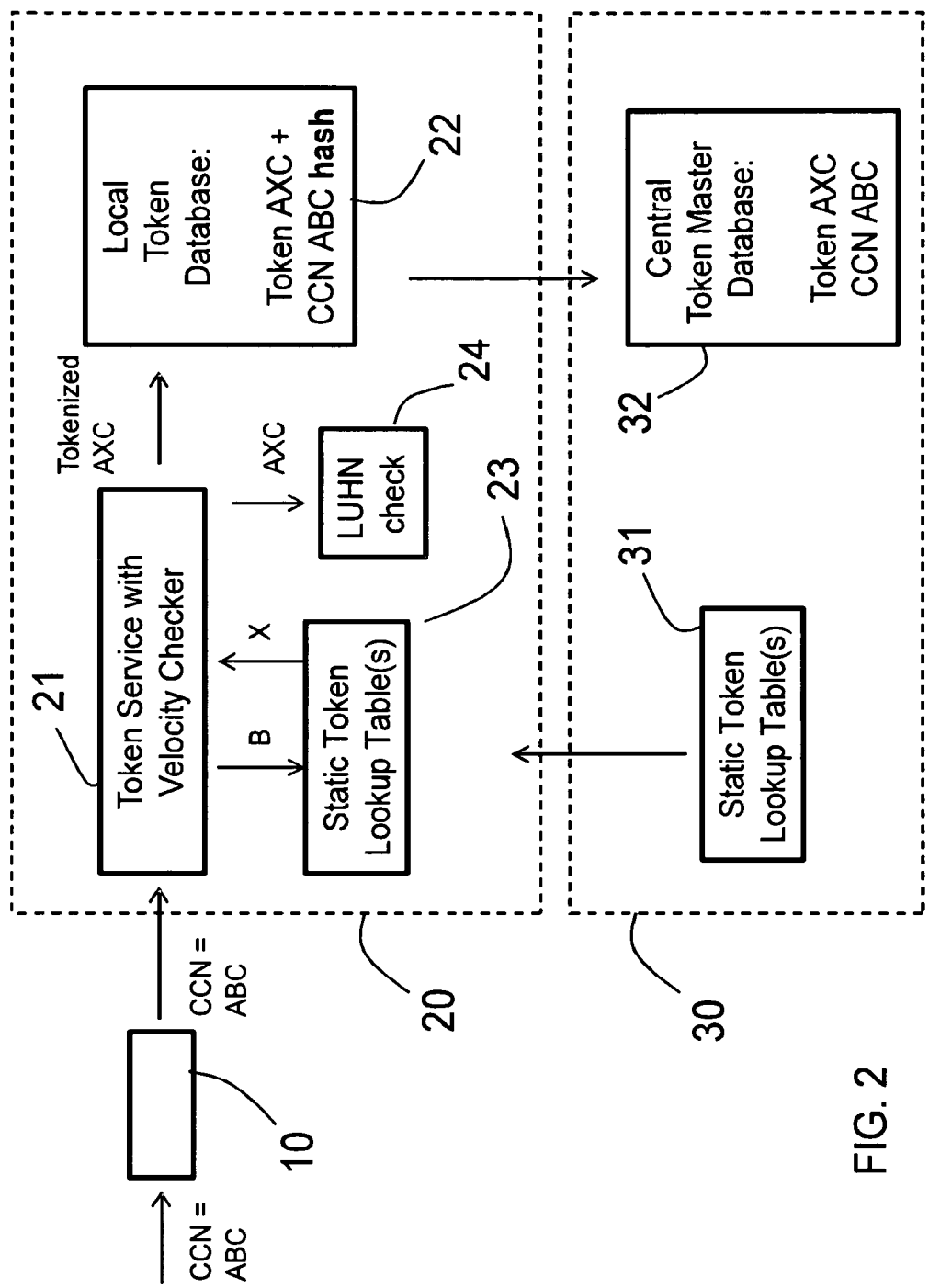
FIG. 2 is a schematic illustration of an embodiment of tokenization with the present invention.

An embodiment of a local server of the present system and method is schematically illustrated in FIG. 2. In this example, Credit Card Numbers (CCN) are registered at the registers 10. The CCN is of the form ABC, where A is the BIN, which is normally 6 digits, B is a random number, typically 12 digits long, and C is the final digits, e.g. the last 4 digits, typically including a final check digit. The check digit may typically be calculated in accordance with the Luhn algorithm. The CCN is transmitted from the register 10, and received in the local server 20. The local server comprises a processor 21, which embodies a token service, and optionally also with a velocity checker. The Token service of the local server uses one or several static token lookup tables 23 provided by a central server 30. The static token lookup tables maps every possible value of the sub-string of characters to be substituted with a corresponding unique token. The tokenization method will be discussed in more detail in the following. The result of the tokenization is that the substring B to be substituted is substituted by a final token X. The X values can be numerical or alphanumerical values, and are preferably of the same length as the B values, i.e. in this example 6 digits. Consequently, the token service identifies a token corresponding to the received B value, and substitutes the B value with the token X to form a tokenized string of characters AXC.

As an extra security measure, the processor 21 may also comprise a velocity checker for monitoring the frequency of substituting a part of CCNs with a token to form tokenized strings of characters. In particular, the velocity checker can be used to detect a peek in the frequency of requests from a certain user/client. The velocity checker may be used to issue an alarm if a determined threshold level is exceeded.

Further, it is also possible to add a check-sum test 24 for the tokenized string of characters AXC. This test may evaluate if the final digit in C is a correct digit in accordance with a check-sum test, e.g. following the Luhn algorithm. If the check-sum digit is correct, the tokenized string of characters may be mistaken for an original sensitive string of characters. Thus, for some applications, the result of the check-sum test may be deemed unsatisfactory if the check-sum digit is correct, whereas for other applications, the result of the check-sum test may be deemed unsatisfactory if the check-sum digit is incorrect. In case the result of said check-sum test is unsatisfactory, the step of substituting section B with a token X may be repeated with another token until said check-sum test is satisfied.

The tokenized string of characters AXC is stored in a local token database 22 in or connected to the local server 20. This database stores the tokenized string of characters AXC, and possibly in combination with the original CCN value ABC and/or a hashed version of ABC. Since many applications that uses CCN values are primarily looking at the A and/or C part of the number, such applications may instead be operated on the tokenized values AXC stored in the local token database.

Further, the tokenized string of characters AXC is preferably transferred to the central server 30, to be stored in a central token master database 32. The central token master database 32 stores the tokenized strings of characters AXC in connection with the original CCN values ABC. Since a static list is used, it is sufficient to transfer AXC from the local server, since the mapping of the tokens with corresponding B values is also known by the server, and can be used in a reveres process in the central server. However, it is also possible to transfer both the tokenized value AXC and the corresponding original value ABC from the local server to the central server.

The transfer of tokenized strings of data from the local server to the central server may occur immediately, but may also be delayed. For example, it is possible to transfer the information to the central server periodically, such as every hour, or once a day, such as during the night when the store is closed.

If the original CCN is stored in the local server, this is preferably only temporary, and the sensitive strings of characters CCN may be cancelled from the local server regularly within a limited time from said transferring, while maintaining said tokenized string of characters in the local database connected to the local server. The original CCNs can e.g. be cancelled once a day, immediately after closing hours, once every second or third day, once every week or the like. More frequent cancellation may also be used, such as within a specified time limit, e.g. within the range 1-5 minutes after the transfer.

All communication between the registers 10 and the local server 20, as well as between the local server 20 and the central server 30 may be encrypted.

Specific embodiments of the tokenization method will now be discussed in more detail.

Figure 3:
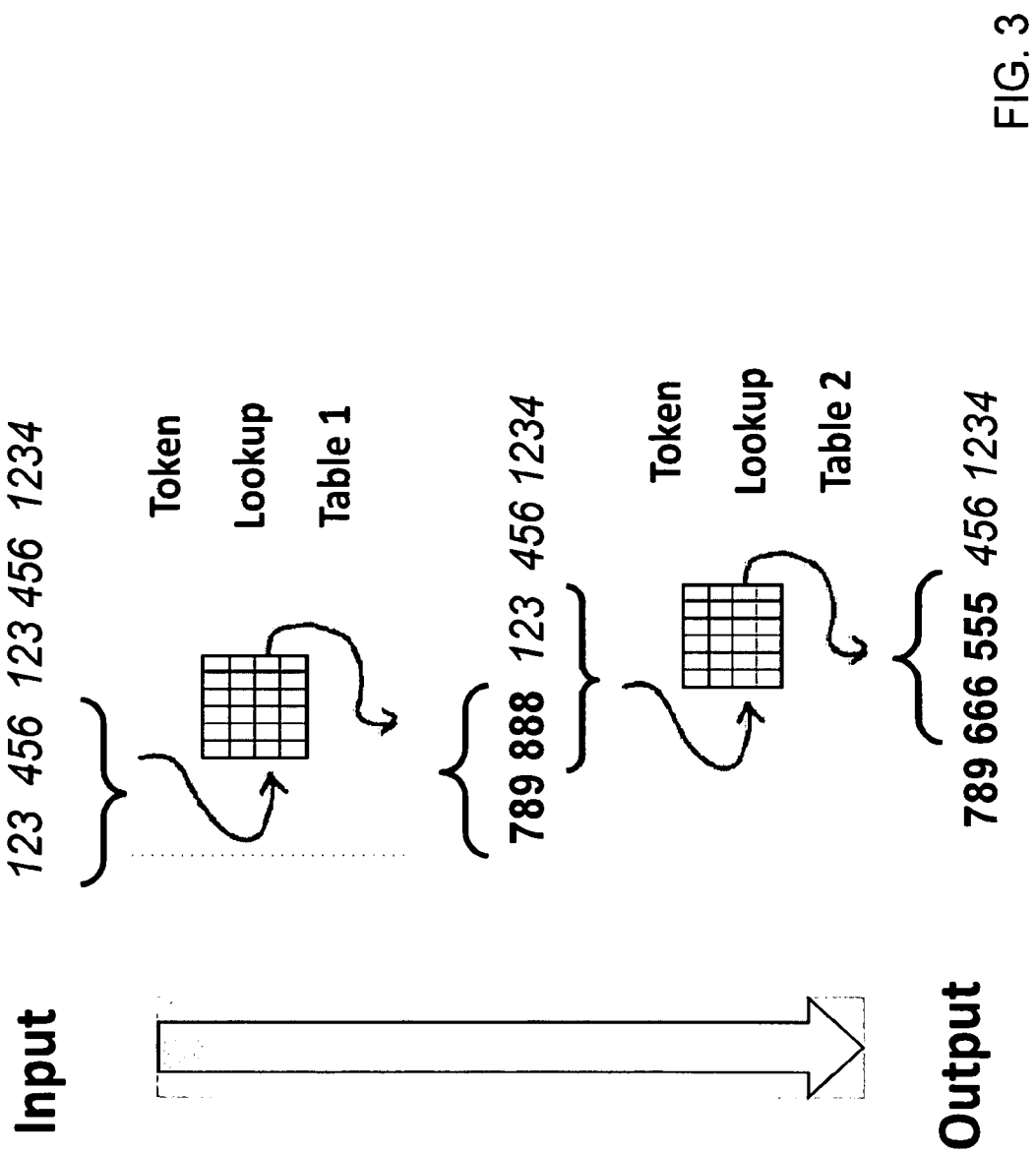
FIGS. 3-9 are schematic illustrations of different embodiment of the tokenization method in accordance with the present invention.

In a first embodiment of a tokenization method, schematically illustrated in FIG. 3, the local server has received two token lookup tables from the central server. A sensitive string of characters including four groups of three digits and one group of four digits is received. In a first step, the first token lookup table is used to substitute the first two groups of three digits each into a token with the same number of digits. Accordingly, a first sub string of six digits in total is here substituted by a first token with six digits, to form a first tokenized string of characters. Then, in a second step, the second token lookup table is used to substitute the second and third group of three digits each into a token with the same number of digits. Here, the second group of digits comprises a token from the first substitution step, whereas the third group of digits comprises digits from the original sensitive string of characters. Accordingly, a second sub string of six digits in total is here substituted by a second token with six digits, to form a second tokenized string of characters.

The resulting second tokenized string of characters also comprises four groups of three digits each, and a fifth group comprising four digits. The first and third group of digits are substituted by tokens from the first and second lookup table, respectively, whereas the second group of digits are substituted by tokens from both the first and second lookup tables, in two consecutive steps.

The use of two different lookup tables enhances the security. However, it is also possible to use the same lookup table for both the consecutive steps.

Figure 4:
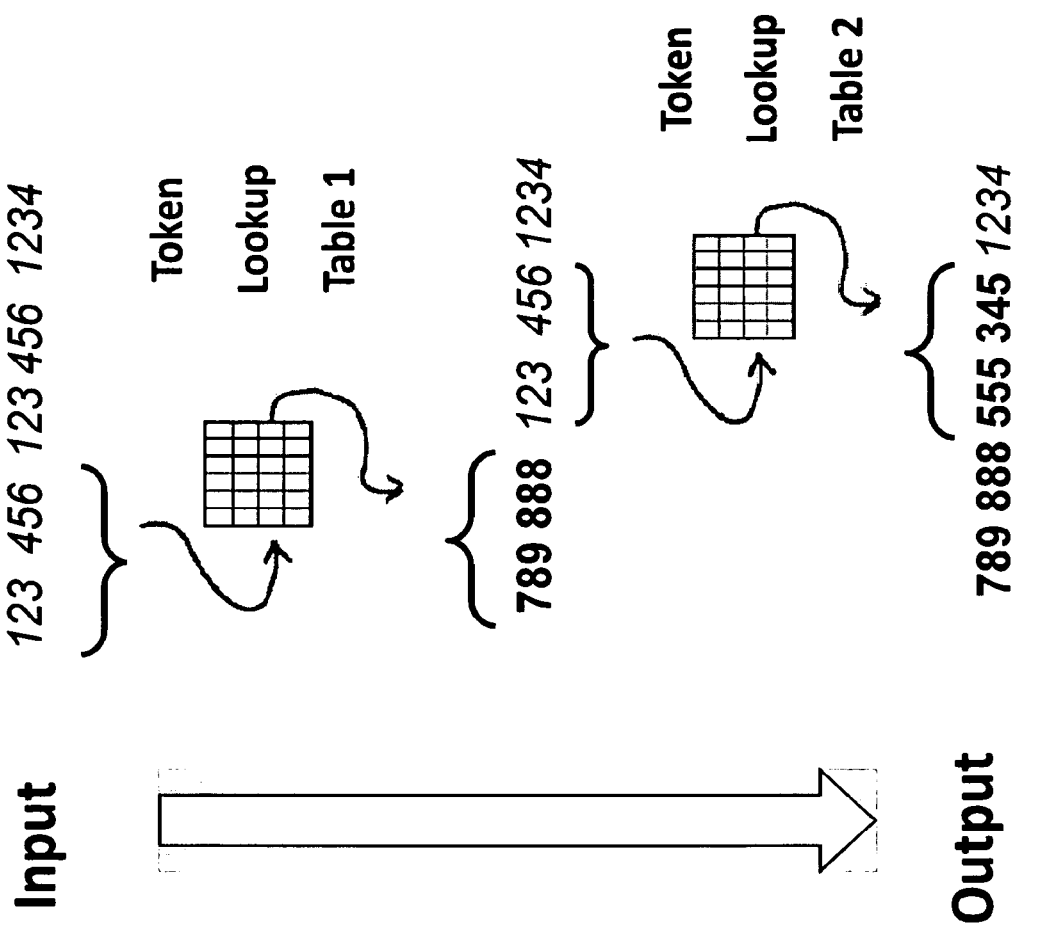

It is also feasible to tokenize different substrings of characters in the two consecutive substitution steps, i.e. without an overlap of characters being twice substituted by tokens. Such an embodiment is schematically illustrated in FIG. 4.

Figure 5:
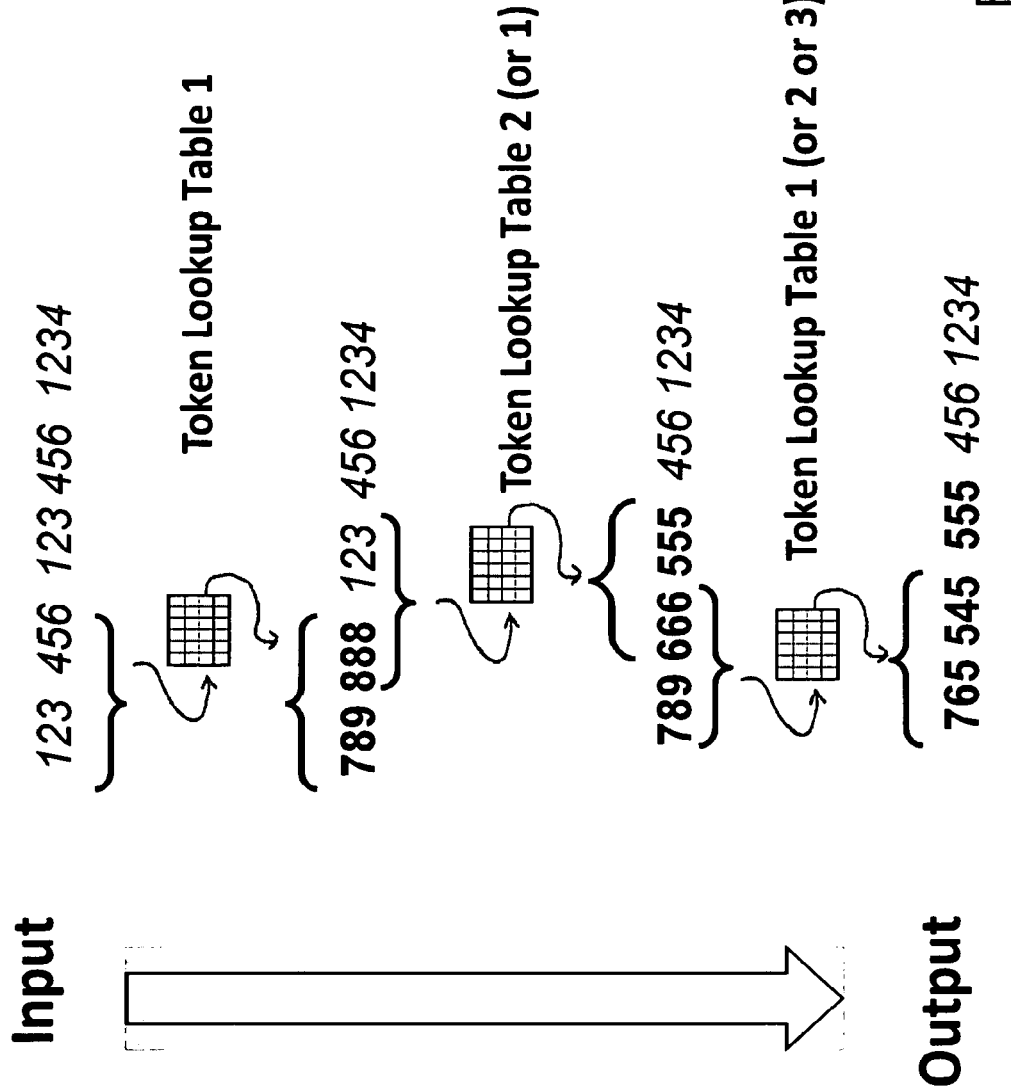

In a third embodiment of a tokenization method, schematically illustrated in FIG. 5, the sensitive string of characters again includes four groups of three digits and one group of four digits. The first two substitution steps are here the same as in the example illustrated in FIG. 3. Thus, in a first step, the first token lookup table is used to substitute the first two groups of three digits each into a token with the same number of digits, to form a first tokenized string of characters. Then, in a second step, the second (or first) token lookup table is used to substitute the second and third group of three digits each into a token with the same number of digits, to form a second tokenized string of characters. Then, in a third substitution step, the first token lookup table is again used to substitute the first two groups of three digits each into a token with the same number of digits, to form a third tokenized string of characters. Alternatively, it is possible to instead use the second token lookup table again in the third substitution step, or to use a third token lookup table.

The resulting third tokenized string of characters also comprises four groups of three digits each, and a fifth group comprising four digits. The first group of digits is substituted by tokens in two consecutive substitution steps. The second group of digits is substituted by tokens in three consecutive substitution steps. The third group of digits is substituted by tokens in one substitution step.

The use of three or more substitution steps enhances the security even further.

Figure 6:
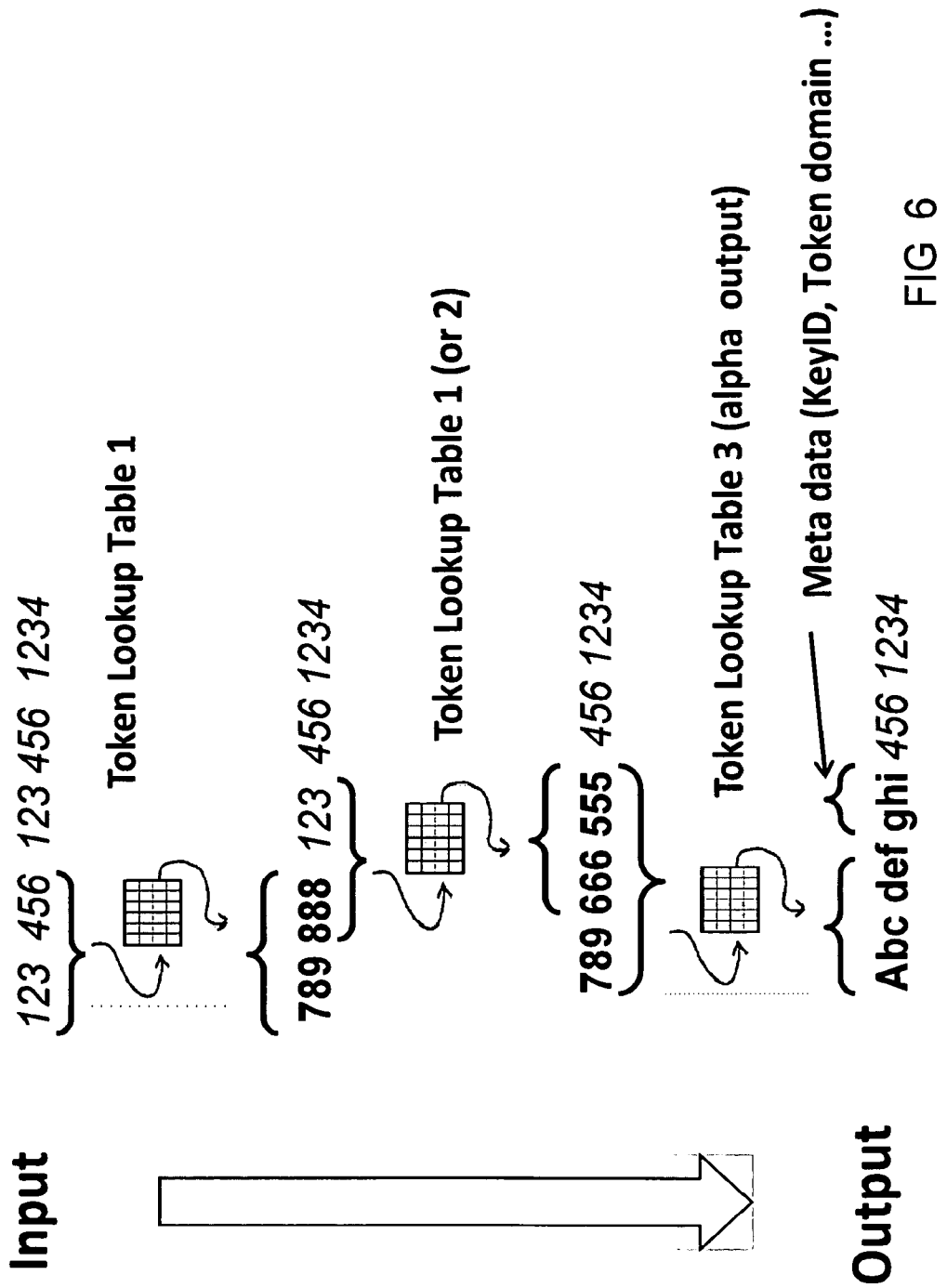

In a fourth embodiment of a tokenization method, schematically illustrated in FIG. 6, the sensitive string of characters again includes four groups of three digits and one group of four digits. The first two substitution steps are here the same as in the example illustrated in FIGS. 3 and 5. Thus, in a first step, the first token lookup table is used to substitute the first two groups of three digits each into a token with the same number of digits, to form a first tokenized string of characters. Then, in a second step, the second (or first) token lookup table is used to substitute the second and third group of three digits each into a token with the same number of digits, to form a second tokenized string of characters. Then, in a third substitution step, a third lookup table is used to substitute the first three groups of three digits each into a token with fewer characters. This is rendered possible by the use of alphanumerical tokens in the third token lookup table. In this example, the 9 digit substring is substituted by a 6 alphanumerical character token. This may be used to form a resulting third tokenized string of characters with fewer characters than the original string of sensitive characters. However, preferably the third tokenized string of characters is filled up with an additional string of metadata, in this example with three characters. Such metadata may comprise information about what token lookup generation that has been used, the token domain, etc. In order to enhance the security level further, the added metadata may optionally be encrypted.

The resulting third tokenized string of characters also comprises four groups of three digits each, and a fifth group comprising four digits. The first and third groups of digits are substituted by tokens in two consecutive substitution steps. The second group of digits is substituted by tokens in three consecutive substitution steps. Additionally, the resulting third tokenized string of characters now also comprises added metadata.

Figure 7:
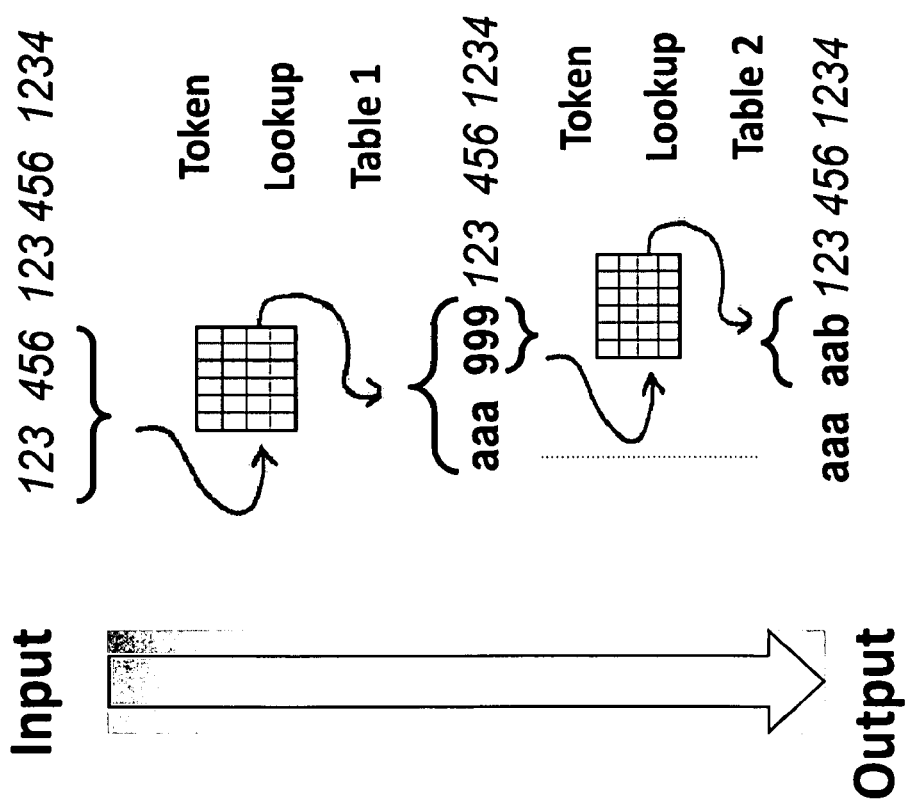

However, it is also possible to use a token lookup table with alphanumerical output for numerical digits as input, but with the same number of output characters as input characters. Such an example is illustrated in FIG. 7. In this example, two different lookup tables are used, but it is also possible to use only one lookup table, or more than two. Further, in this example, the second substitution step only replaces a substring of the characters which have already been tokenized in the first substitution step. However, as before, it is also possible to include one or more digits that have not yet been replaced by a token.

Figure 8:
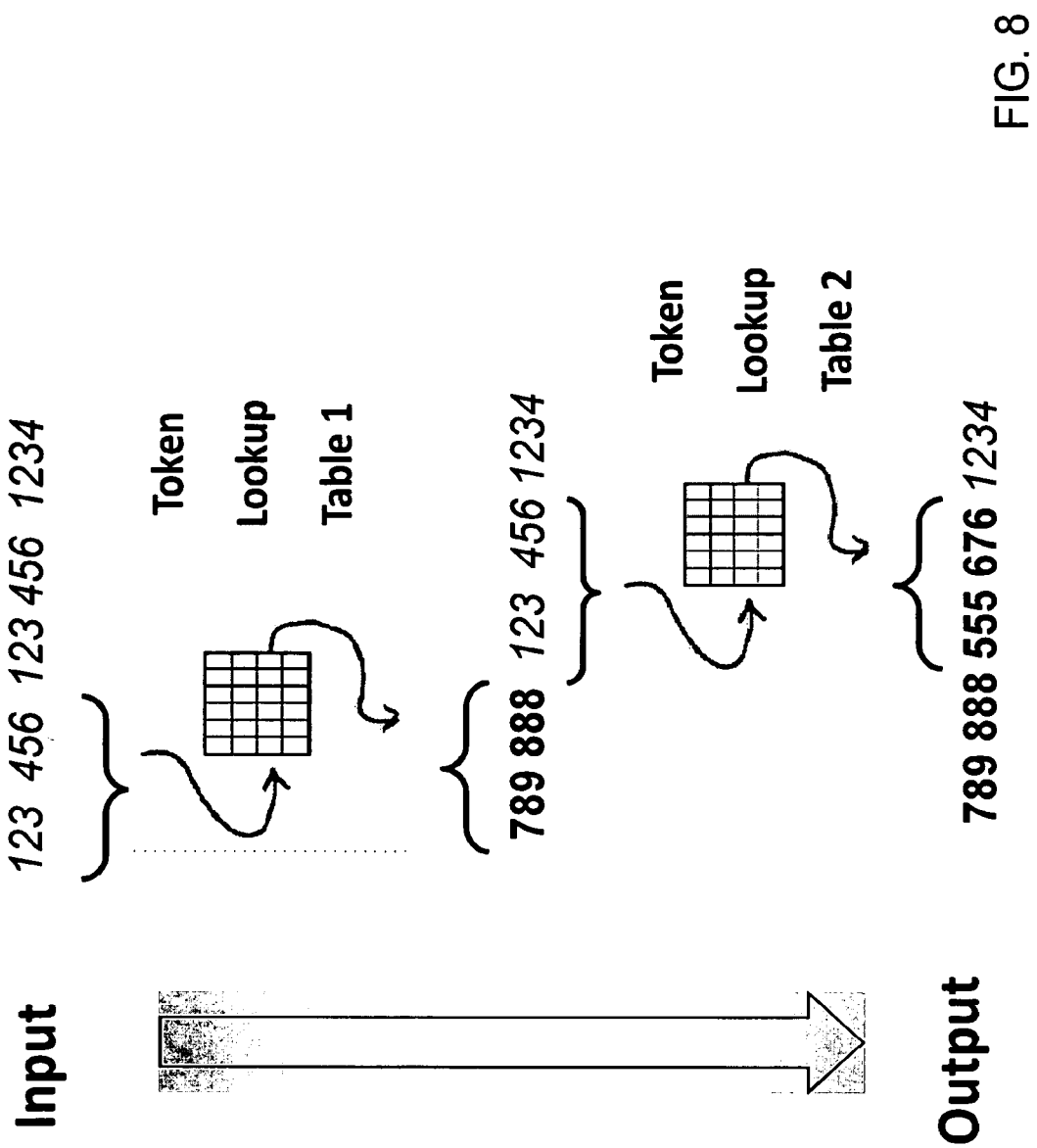

It is also possible to not use any overlap between the two or more substitution steps. Such an embodiment is schematically illustrated in FIG. 8, where two groups of digits are first replaced by tokens in a first substitution step, and thereafter two different groups of digits are replaced by tokens in a second substitution step.

Figure 9:
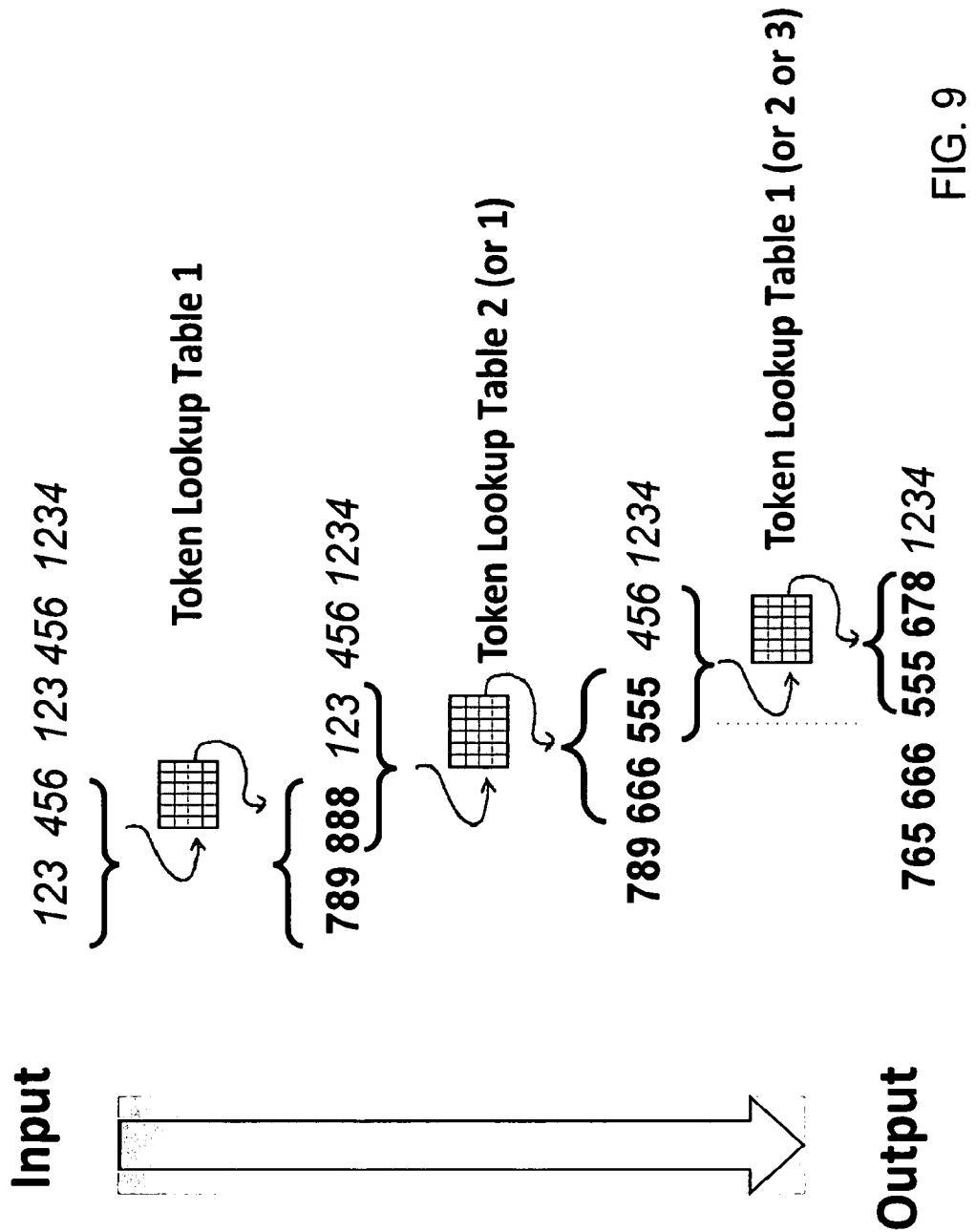

A consecutive chaining of the tokens may also be arranged in other schemes. One possibility is to always in the subsequent substitution steps include a first part of characters which have been replaced by tokens, and a second part of tokens which have not been replaced by tokens. Such an embodiment is schematically illustrated in FIG. 9

Many other variations of the tokenization method discussed above are possible. For example, the various aspects of the specific embodiments which have been disclosed may be combined in various ways. It is thus possible to use two, three or even more substitution steps. Each substitution step may replace only data that have already been replaced by a token, only data that have not yet been replaced by a token, or any combination of the two. Further, the token may, in each substitution step have the same number of characters as in the substrings being replaced, or a different number of characters. Still further, the token may be of the same format as the input, e.g. numerical, alphanumerical, etc, or of a different format. The skilled addressee will acknowledge that numerous alternative combinations of these alternatives would be feasible. Even though the above-discussed examples mostly use substrings with 6 characters to be replaced by tokens at each substitution step, it is possible to use any number of characters in each substring. If larger substrings are replaced each time, the token lookup tables need to be larger, but at the same time the security is enhanced.

The above-discussed example uses static lists to map the substrings to be replaced with a token. In order to increase the security further, the lists are preferably replaced regularly in said local server. In case the hierarchical system comprises several local servers, the list may be general lists assigned to all said local servers, or unique local lists assigned to each of said local servers, so that the local lists comprise tokens belonging to different substrings of possible tokens.

It is also possible to use a list that map at least two token values to each possible digit combination of the part of said sensitive string of characters to be replaced, wherein the choice between said at least two token values is preferably made by random. This increases the security even further. In such an embodiment, a counter may be used to guarantee the uniqueness of each concatenation of the part to be replaced, i.e. B, and the counter value. This may lead to doublets, i.e. several tokenized character strings for a single CCN, but this may be handled at higher levels in the hierarchy.

A hash value for said sensitive string of characters may also be generated, and stored in association with the tokenized string of characters in the local database connected to said local server, and/or in databases at higher levels of the hierarchical system. The hash value is preferably obtained by means of an iterative cryptographic has function, such as MD5 or SHA-1. It is also preferred to use a keyed Hash Message Authentication Code (HMAC).

Even though the above-discussed examples are solely concerned with a system and method handling credit card numbers (CCN), it should be appreciated by persons skilled in the art that similar methods and systems may also be used for secure handling of other sensitive strings of characters, such as social security numbers (SSN), driver license numbers, bank account numbers, and the like. The sensitive strings of characters may be of different formats, such as a) 6 digits clear, 6 digits randomized, and to be replaced by a token, and 4 digits clear (6+6+4), as in a standard CCN;
b) 4 digits clear, 8 digits randomized, and to be replaced by a token, and 4 digits clear (4+8+4);
c) 12 digits randomized, and to be replaced by a token, and 4 digits clear (12+4);
d) 21 digits randomized, and to be replaced by a token, and 4 digits clear (21+4); and
e) 15 digits randomized, and to be replaced by a token, and 1 digit clear (15+1).

However, other types of formats are also feasible.

Still further, it is also possible to modify, in a predetermined way, one or several of the substrings to be tokenized. Hereby, the tokenization of the same substring will not be the same at all times, which enhances the security further. For example, it is possible to use an initialization vector, comprising a predetermined string of characters, to modify the substring to be tokenized before tokenization. The modification may e.g. be a linear addition or XOR operation of the initialization vector to the substring to be tokenized. The initialization vector may e.g. be formed by characters or digits in the sensitive string of characters which are not to be replaced by tokens.

Specific embodiments of the invention have now been described. However, several alternatives are possible, as would be apparent for someone skilled in the art. For example, the methodology herein described can be used for any type of sensitive character strings, and not only CCNs. Further, the system may comprise any level of hierarchical levels. Still further, it is possible to use only one string of token lookup tables within the system, or a multitude of different token lookup tables. Still further, the implementation of the tokenization scheme may, as discussed above, be varied in numerous ways.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A method of tokenization, comprising:
receiving a string of characters in a first character domain at a local server;
accessing, by the local server, a first token table and a second token table, the first token table and the second token table each mapping each of a set of input values in the first character domain to a different token value comprising characters in a second character domain different from the first character domain;
tokenizing, by the local server, the accessed string of characters by modifying a first substring of the access string of characters with one or more initialization vectors and replacing the first modified substring of the accessed string of characters with a first token value mapped to a value of the first substring by the first token table to form a first intermediate string of characters comprising characters in the first character domain and characters in the second character domain;
tokenizing, by the local server, the first intermediate string of characters by replacing a second substring of the first intermediate string of characters comprising characters in the first character domain by replacing the second substring of the first intermediate string of characters with a second token value mapped to a value of the second substring of the first intermediate string of characters by the second token table to form a tokenized string of characters; and
transmitting, by the local server, the tokenized string of characters to a central server.

2. The method of claim 1, wherein the tokenized string of characters comprises characters in the second character domain.

3. The method of claim 1, wherein the tokenized string of characters comprises characters in the first character domain and characters in the second character domain.

4. The method of claim 1, wherein the first character domain and the second character domain have no overlapping characters.

5. The method of claim 1, wherein the first character domain comprises numeric characters and wherein the second character domain comprises alphabet characters.

6. A server, comprising:
a non-transitory computer-readable storage medium storing executable instructions that, when executed, perform steps comprising:
receiving a string of characters in a first character domain at the server;
accessing, by the server, a first token table and a second token table, the first token table and the second token table each mapping each of a set of input values in the first character domain to a different token value comprising characters in a second character domain different from the first character domain;
tokenizing, by the server, the accessed string of characters by modifying a first substring of the access string of characters with one or more initialization vectors and replacing the first modified substring of the accessed string of characters with a first token value mapped to a value of the first substring by the first token table to form a first intermediate string of characters comprising characters in the first domain character and characters in the second character domain;
tokenizing, by the server, the first intermediate string of characters by replacing a second sub string of the first intermediate string of characters comprising characters in the first character domain by replacing the second sub string of the first intermediate string of characters with a second token value mapped to a value of the second substring of the first intermediate string of characters by the second token table to form a tokenized string of characters; and transmitting, by the server, the tokenized string of characters to a central server; and a hardware processor configured to execute the instructions.

7. The server of claim 6, wherein the tokenized string of characters comprises characters in the second character domain.

8. The server of claim 6, wherein the tokenized string of characters comprises characters in the first character domain and characters in the second character domain.

9. The server of claim 6, wherein the first character domain and the second character domain have no overlapping characters.

10. The server of claim 6, wherein the first character domain comprises numeric characters and wherein the second character domain comprises alphabet characters.

11. A non-transitory computer-readable storage medium storing executable computer instructions that, when executed by a processor, cause the processor to perform steps comprising:

receiving a string of characters in a first character domain at a local server;

accessing, by the local server, a first token table and a second token table, the first token table and the second token table each mapping each of a set of input values in the first character domain to a different token value comprising characters in a second character domain different from the first character domain;

tokenizing, by the local server, the accessed string of characters by modifying a first substring of the access string of characters with one or more initialization vectors and replacing the first modified substring of the accessed string of characters with a first token value mapped to a value of the first substring by the first token table to form a first intermediate string of characters comprising characters in the first character domain and characters in the second character domain;

tokenizing, by the local server, the first intermediate string of characters by replacing a second substring of the first intermediate string of characters comprising characters in the first character domain by replacing the second substring of the first intermediate string of characters with a second token value mapped to a value of the second substring of the first intermediate string of characters by the second token table to form a tokenized string of characters; and transmitting, by the local server, the tokenized string of characters to a central server.

12. The non-transitory computer-readable storage medium of claim 11, wherein the tokenized string of characters comprises characters in the second character domain.

13. The non-transitory computer-readable storage medium of claim 11, wherein the tokenized string of characters comprises characters in the first character domain and characters in the second character domain.

14. The non-transitory computer-readable storage medium of claim 11, wherein the first character domain and the second character domain have no overlapping characters.

* * * * *